US007908868B2

United States Patent
Bunel et al.

(10) Patent No.: US 7,908,868 B2
(45) Date of Patent: Mar. 22, 2011

(54) DEVICE FOR MOUNTING AN AIR-FLOW DIVIDING WALL IN A TURBOJET ENGINE AFTERBURNER

(75) Inventors: Jacques Marcel Arthur Bunel, Fresnes (FR); Alain Pierre Page, Montgeron (FR); Jacques Andre Michel Roche, Saint Sulpice les Feuilles (FR); Yann Vuillemenot, Paris (FR)

(73) Assignee: SNECMA, Paris (FR)

( * ) Notice: Subject to any disclaimer, the term of this patent is extended or adjusted under 35 U.S.C. 154(b) by 987 days.

(21) Appl. No.: 11/693,339

(22) Filed: Mar. 29, 2007

(65) Prior Publication Data

US 2007/0227152 A1    Oct. 4, 2007

(30) Foreign Application Priority Data

Mar. 30, 2006 (FR) ...................... 06 02740

(51) Int. Cl.
*F02K 3/10* (2006.01)
(52) U.S. Cl. ........................... 60/761; 60/765
(58) Field of Classification Search .................. 60/765, 60/761, 762, 763, 764, 766, 749, 750
See application file for complete search history.

(56) References Cited

U.S. PATENT DOCUMENTS

| 3,826,088 | A | * | 7/1974 | Nash et al. | 60/766 |
| 4,718,230 | A | * | 1/1988 | Honeycutt et al. | 60/766 |
| 4,901,527 | A | * | 2/1990 | Nash et al. | 60/765 |
| 5,396,763 | A | | 3/1995 | Mayer et al. | |
| 5,400,589 | A | * | 3/1995 | Mahias et al. | 60/762 |
| 5,813,221 | A | | 9/1998 | Geiser et al. | |
| 6,976,361 | B1 | * | 12/2005 | Cortes et al. | 60/762 |
| 2005/0252216 | A1 | * | 11/2005 | Roche et al. | 60/765 |
| 2006/0016193 | A1 | * | 1/2006 | Roche et al. | 60/761 |
| 2006/0016194 | A1 | * | 1/2006 | Roche et al. | 60/765 |

FOREIGN PATENT DOCUMENTS

| EP | 0 328 813 A1 | 8/1989 |
| EP | 0 550 126 A1 | 7/1993 |
| EP | 1 491 752 A1 | 12/2004 |

* cited by examiner

*Primary Examiner* — Ted Kim
(74) *Attorney, Agent, or Firm* — Oblon, Spivak, McClelland, Maier & Neustadt, L.L.P.

(57) ABSTRACT

A device for mounting a dividing wall for separating the main air stream and the bypass air in a bypass turbojet engine afterburner is disclosed. The device includes an attachment unit which attaches the upstream end of the wall to a guide vane casing and a supporting unit which supports the downstream end of the wall provided on flame holder arms of the afterburner radially on the inside of the dividing wall.

12 Claims, 3 Drawing Sheets

DEVICE FOR MOUNTING AN AIR-FLOW DIVIDING WALL IN A TURBOJET ENGINE AFTERBURNER

BACKGROUND OF THE INVENTION AND DESCRIPTION OF THE PRIOR ART

The present invention relates to a device for mounting a dividing wall for separating the main air stream and the bypass air in a bypass turbojet engine afterburner.

This wall is arranged inside a cylindrical guide vane casing of the turbojet engine and therewith delineates an annular passage in which the bypass air can flow, which bypass air is intended to be mixed partially with the main air stream flowing inside the wall, downstream of the afterburner.

The dividing wall is fixed at its upstream end to the guide vane casing by means of cylindrical studs which extend radially into the bypass flow and the external end of which is fixed to the guide vane casing and the internal end of which is mounted, with sealing, in a corresponding bore in the wall.

At its downstream end the wall has notches oriented downstream and penetrated by flame holder arms which extend radially from the guide vane casing into the main air stream. Each arm extends some distance from the edge of the corresponding notch in the wall and with this edge defines a cross section through which air from the bypass stream can escape into the main air stream.

The downstream part of this wall is thus mounted with an overhang and can expand freely under the effect of the rise in temperature when the turbojet engine is running.

However, the pressure of the bypass stream is higher than that of the main air stream from the turbojet engine turbine, and this gives rise to significant loadings on the downstream part of the dividing wall and results in local deformations of this downstream part toward the axis of the turbojet engine and in an increase in the aforementioned leakage cross section, thus reducing engine performance.

One known solution to this problem is to stiffen the dividing wall by increasing its thickness and forming stiffeners in its downstream end part. However, this solution is not satisfactory because it is complicated and expensive to achieve and leads to an increase in the mass of the dividing wall—something which is disadvantageous in the aeronautical industry.

SUMMARY OF THE INVENTION

It is a particular object of the invention to provide a simpler and more economical alternative solution to this problem.

To this end, the invention proposes an afterburner for a bypass turbojet engine, comprising a substantially cylindrical dividing wall separating the main air stream from the bypass air, means of attaching the upstream end of this wall to an external casing, and means for supporting the downstream end of this wall, these support means being provided on flame holder arms extending radially with respect to the axis of the afterburner, wherein the dividing wall comprises orifices or notches through which the flame holder arms pass, each comprising a substantially radial flange extending inside the dividing wall and forming a surface for supporting the edge of a corresponding orifice or notch in the dividing wall, and a cylindrical rim substantially coaxial with the arm is formed on the flange and extends radially outward in the orifice or the notch in the dividing wall and along the edge of the orifice or of the notch.

According to the invention, the downstream part of the dividing wall is positively supported by structural elements of the afterburner allowing the pressure loadings applied to this downstream part to be transmitted to the structural elements and preventing it from deforming inward during operation while at the same time affording the wall the freedom of thermal expansion with respect to the structural elements.

It is thus possible to produce afterburner systems with high extraction ratios capable of withstanding high pressure loadings across the dividing wall.

The support means are formed on flame holder arms which extend radially with respect to the axis of the chamber through the orifices or notches in the downstream part of the wall. Each flame holder arm comprises a substantially radial flange which extends inside the dividing wall and forms a support surface supporting the edge of a corresponding orifice or notch in the dividing wall. This flange supports the pressure loadings applied to the wall and, in operation, extends a short distance from the dividing wall so as to reduce the cross section for leakage between the flame holder arm and the wall.

The flange may be formed as a single piece with the flame holder arm or be attached to the flame holder arm.

Advantageously, a cylindrical rim substantially coaxial with the arm is formed on the flange and extends radially outward in the orifice or the notch in the dividing wall and along the edge of the orifice or of the notch.

This cylindrical rim is preferably tall enough to prevent hot gases from the main air stream and passing between the flange and the wall from entering means of ventilation of the flame holder arm.

In a preferred embodiment of the invention, the cylindrical rim extends along the upstream edge of the flange and along at least part of the downstream edge of the flange and is attached to lateral lugs used for fixing the flame holder arm to the casing.

The part of the arm that extends radially inside the flange advantageously has an aerodynamic profile to guarantee that the flow of hot gases around the arm is clean and stable, that is to say with no separation or recirculation.

When the dividing wall extends at least partly inside a cylindrical sleeve that provides thermal protection to an afterburner jetpipe, the downstream end of the dividing wall comprises means for bearing radially against this sleeve in order to limit the outward deformations of the downstream end of the wall.

These radial-bearing means are, for example, formed of small bridges attached to the downstream end of the dividing wall.

This appreciably improves the dynamic behavior of the dividing wall, of which the movements at its downstream end are thus radially limited inward and outward.

In another embodiment of the invention, the afterburner involves annular afterburning and the dividing wall is supported by small bridges attached to the trailing edges of the flame holder rings.

The invention also relates to a bypass turbojet engine which comprises an afterburner as described hereinabove.

The invention also relates to a flame holder arm for an afterburner of the aforementioned type comprising, at one end, fixing lugs and which comprises, at the base of these lugs, a substantially radial external flange formed with a cylindrical rim attached to the fixing lugs that secure the arm. This flange may be formed as one piece with the arm or be attached thereto.

BRIEF DESCRIPTION OF THE DRAWINGS

The invention will be better understood and other details, characteristics and advantages thereof will become apparent from reading the following description given by way of non-limiting example and with reference to the attached drawings in which.

DESCRIPTION OF THE PREFERRED EMBODIMENTS

Figure 1:
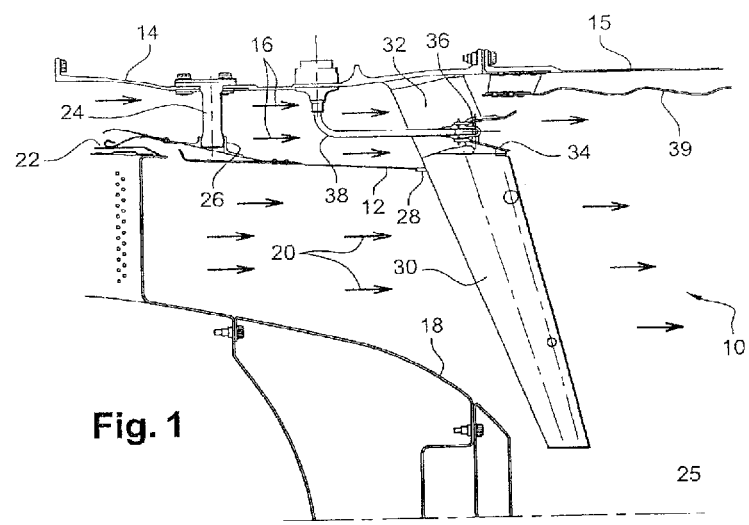
FIG. 1 is a schematic half view in axial section of a bypass turbojet engine afterburner.

Reference is made first of all to FIG. 1 which depicts a bypass turbojet engine afterburner 10 situated downstream of the turbine and upstream of the turbojet engine jetpipe.

The afterburner 10 comprises a substantially cylindrical wall 12 (also known as a "confluence") that separates the main air stream from the bypass air and is mounted inside an external cylindrical exhaust casing 14 and around an exhaust cone 18 of the turbojet engine. The wall 12 and the casing 14 between them delimit an external annular passage through which the cold stream or bypass air stream 16 of the turbojet engine, generated by a fan upstream of the turbojet engine and used to increase the thrust and to ventilate parts of the turbojet engine, flows. The wall 12 delimits with the exhaust cone 18 an internal annular passage through which the hot stream or main air stream 20 of the turbojet engine, which consists of the exhaust gases from the combustion chamber of the turbojet engine, flows. The main air stream 20 and the bypass air 16 are partially mixed downstream of the wall 12 in order to increase the thrust of the turbojet engine.

The wall 12 is engaged axially at its upstream end on a shroud 22 of a part of the turbojet engine situated upstream of the afterburner 10 and is fixed to the guide vane casing 14 by three cylindrical pegs 24 extending radially into the bypass air stream 16 between the wall 12 and the casing 14 and uniformly distributed about the axis 25 of the turbojet engine.

Figure 2:
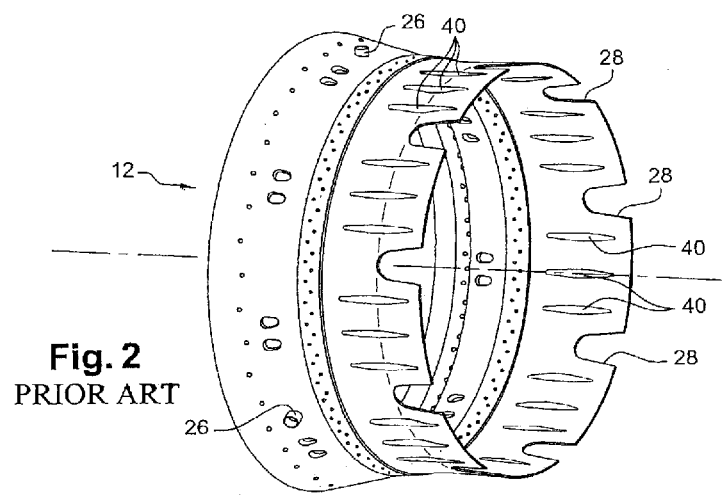
FIG. 2 is a schematic perspective view of a dividing wall according to the prior art.

Each peg 24 has a radially external end fixed by bolts to the casing 14 and a radially internal end mounted, with sealing, in an external radial bore 26 formed on an upstream end part of the wall 12 as is visible in FIGS. 1 and 2. The internal ends of the pegs 24 are slightly flared so as to allow the ends of the pegs to slide and swivel slightly in the bores 26 in the wall when there is differential thermal expansion of the wall and of the casing.

The wall 12 also comprises, at its downstream end, U-shaped notches 28, the openings of which are directed downstream and through which pass flame holder arms 30 which extend radially with respect to the axis 25 of the turbojet engine and obliquely with respect thereto, their radially external end being fixed to the guide vane casing 14 and their radially internal end being offset in the downstream direction and located downstream of the exhaust cone 18. The flame holder arms 30 pass with clearance through the notches 28 to allow freedom of thermal expansion of the wall 12 with respect to the arms 30 and together with the edges of the notches define a cross section for the leakage of air from the bypass stream toward the main air stream.

The radially internal part of each arm 30 which extends into the main air stream 20 is in the form of a hollow dihedron, the vertex of which is directed upstream, and inside which there extends a fuel injection harness (not depicted), the radially external end of which is fixed to the guide vane casing 14 and connected to fuel supply means. The arm is fixed to the guide vane casing 14 by means of lateral lugs 32 which extend between the wall 12 and the casing 14 and between which air from the bypass air stream 16 circulates, it being possible for some of this air to enter the arm and be diffused over the fuel injection harness by way of ventilation means (not depicted).

The fixing lugs 32 comprise, downstream, a housing for securing a C-section burner ring 34, the opening of which is directed downstream and which contains a fuel injection harness 36 which is coupled to the aforesaid fuel supply means by elbowed pipes 38 passing axially between the fixing lugs 32 for fixing the arms.

A cylindrical sleeve 39 is fixed for example by rivets to a cylindrical afterburner jetpipe 15 fixed to the downstream end of the guide vane casing 14 to afford this pipe 15 thermal protection against the increase in temperature caused by the burning of the mixture of gas and fuel injected into the chamber 10.

During operation, the pressure of the bypass air stream 16 is higher than that of the main air stream 20 and this gives rise to significant loadings on the downstream end part of the wall 12 and results in local deformations of this part toward the axis 25 of the turbojet engine and in an increase in the aforesaid leakage cross section, thus reducing engine performance.

In the known art, attempts are made at limiting these deformations using stiffeners and by thickening the wall. In the example depicted in FIG. 2, the wall 12 is thick, its downstream part comprises axial stiffening ribs 40 uniformly distributed about the axis, and the notches 28 have edges projecting toward the inside of the wall.

However, this solution is not entirely satisfactory; it is complicated and expensive to achieve and leads to an increase in the mass of the wall 12.

The invention allows the aforesaid problem to be solved using means for supporting the downstream end of the dividing wall which are provided on structural elements of the afterburner 10 and situated radially on the inside of the wall.

In the embodiment of the invention depicted in FIGS. 3 to 7 where the elements from FIGS. 1 and 2 are denoted by the same reference numerals increased by one hundred, the flame holder arms 130 of the afterburner comprise external flanges 150 forming means of supporting the downstream end of the dividing wall 112.

Figure 3:
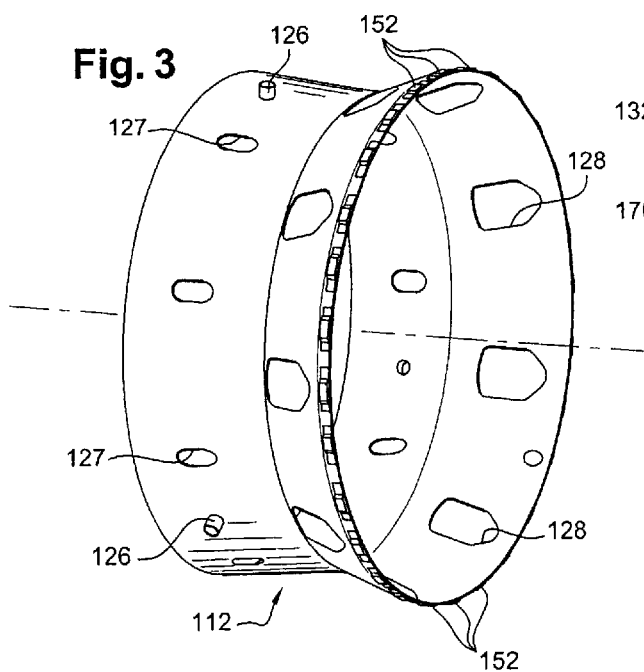
FIG. 3 is a schematic perspective view of a dividing wall according to the invention.
Figure 4:
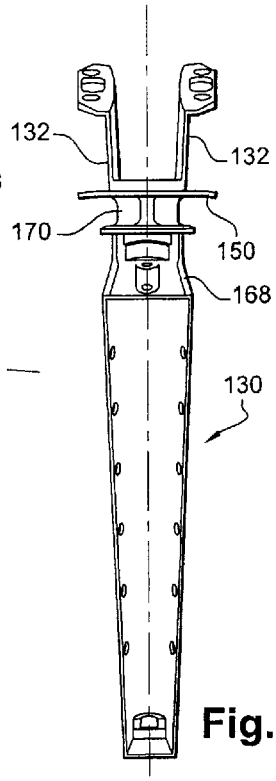
FIG. 4 is a schematic front view of a flame holder arm according to the invention, viewed from the downstream end.
Figure 5:
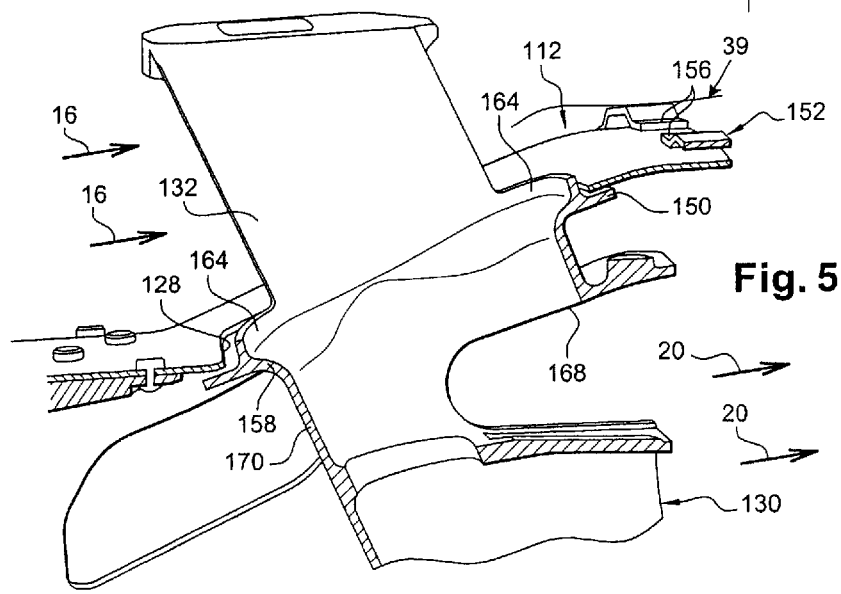
FIGS. 5 to 7 are partial schematic perspective views of the device according to the invention.

This wall 112 has a substantially biconical shape, its ends being flared outward (FIG. 3). As in the prior art, the upstream end part of the wall 112 comprises radial bores 126 for housing cylindrical pegs 24 for attaching the wall to the guide vane casing 14 and orifices 127 for the passage of fuel injectors.

The downstream end part of the wall 112 comprises orifices 128 through which the flame holder arms 130 pass and the edges of which bear on the external flanges 150 of these arms.

The external flange 150 of each arm is formed at the base of the fixing lugs 132 and extends over 360° about the axis of the arm inside the wall 112 to form an annular surface for supporting the wall 112.

Figure 6:
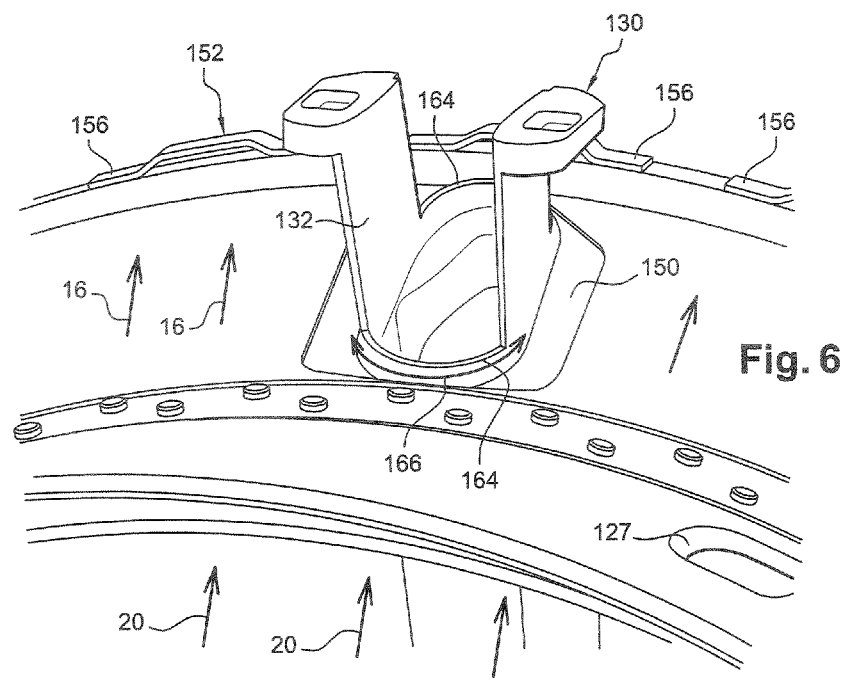

In the example depicted, the flange 150 is formed as a single piece with the arm 130 and is connected to the dihedron of the arm by a fillet 158 on the inside (FIG. 6). The flange has a substantially polygonal contour and its dimensions exceed those of the corresponding orifice 128 in the wall 112 so that the edge of this orifice is fully supported by the flange. The thickness of the flange 150 is determined in such a way as to prevent it from deforming itself when the wall transmits to it the pressure loadings to which it is subjected during operation and, for example, its thickness exceeds that of the wall and is substantially identical to that of the walls of the dihedron.

Figure 7:
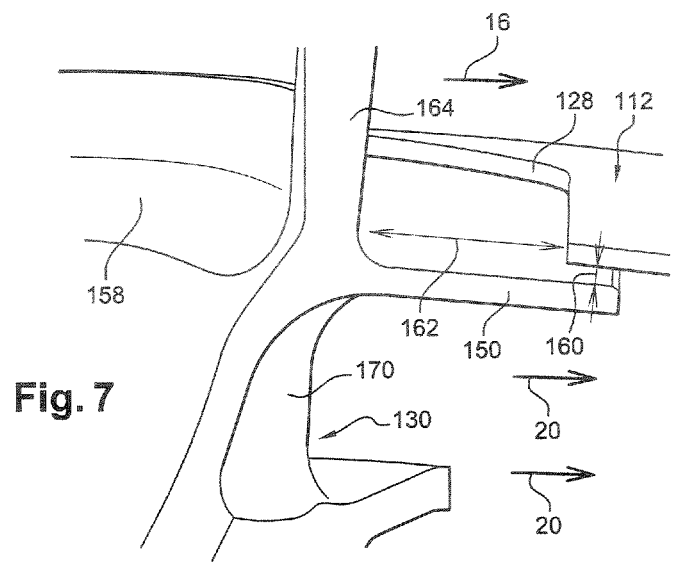

The flange is shaped to run parallel to the wall 112 and a short distance therefrom (FIG. 7), in order to limit the leakage cross section 160 for the leakage from the bypass air stream to the main air stream and the leakage of hot gases from the bypass air stream to the main air stream, this leakage cross section being appreciably smaller than the leakage cross section in the prior art which was defined by the edge of the notch in the wall and the arm, as schematically depicted by the arrow 162 in FIG. 7.

An external cylindrical rim 164 is formed on the flange 150 on the opposite side to the fillet 158 and extends substantially coaxially with respect to the arm and inside the corresponding orifice 128 in the wall 112. The radial distance with respect to the axis of the arm between the cylindrical rim 164 and the edge of the orifice 128 is determined in such a way as to allow free thermal expansion of the wall with respect to the arm.

In the example depicted, the cylindrical rim 164 extends along the upstream edge and along the downstream edge of the flange 150 and is connected to the fixing lugs 132 used to fix the arm to the guide vane casing 14.

This rim 164 has a height or an axial dimension with respect to the axis of the arm which is determined such that the hot gases entering the bypass stream by passing through the aforesaid leakage cross section between the upstream edge of the flange 150 and the wall 112 are deflected by the rim 164 and flow around the arm as depicted by the arrows 166 in FIG. 6, thus preventing these hot gases from entering the aforesaid ventilation means as this would be to the detriment of the cooling of the arms and of their fuel injection harness.

The flame holder arm 130 comprises, downstream of the dihedron and near the flange, a housing 168 for attaching a burner ring 34 similar to that of FIG. 1. The part 170 of the dihedron which extends radially between the housing 168 and the flange 150 has an aerodynamic profile so as not to impede the flow of the main air stream 20 between the burner ring and the flange and so as not to cause any separation or recirculation of the flow.

In the example depicted, the wall 112 has an axial dimension greater than that of the wall 12 of FIG. 2 and its upstream end extends inside the cylindrical sleeve 39 affording thermal protection to the afterburner jetpipe 15 and comprises small bridges 152 fixed to its external periphery and uniformly distributed about the axis of the wall, these small bridges 152 being intended to bear radially against the sleeve 39 to limit the outward deformations of the wall while at the same time allowing the bypass air to pass between the wall 112 and the sleeve 39.

The small bridges 152 are in the shape of an Ω of an inverted U and are fixed to the wall at their ends 156 by welding or brazing. The small bridges are, for example, 27 in number. The bypass air can flow inside the small bridges or between the small bridges.

The thickness of the wall 112 is less than that of the wall of FIG. 2 and for example is between about 1 and 2 mm.

In operation, the wall 112 expands radially outward and is no longer supported or is supported locally by the flanges of the flame holder arms. The pressure difference between the main air stream and the bypass air stream is applied to the downstream end of the wall which deforms slightly inward and comes to bear radially on the flanges of the arms 130 to limit this deformation. The downstream end of the wall can also come to bear radially against the heat-protection sleeve 39 in order also to limit the outward deformation of the wall. The means for supporting the downstream end of the wall and for it to bear against thus allow the dynamic behavior of this end of the wall 112 to be improved.

Of course, the invention is not restricted to the embodiment described in the foregoing and depicted in the attached drawings. For example, the wall 112 may comprise notches through which the flame holder arms pass so that the flanges of the arms form means of supporting the edges of the notches.

It is also possible for the flange to be attached and fixed to the arm by any appropriate technique. The flange is, for example, made of a ceramic matrix composite (CMC) material and fixed by rivets or screws to a flame holder arm also made of CMC.

The flange may equally extend along just part of the edge of the orifice or of the notch in the wall.

It is also possible for the housing for securing the ring sector of the flame holder arm 130 to be provided on the arm fixing lugs, as is the case in the prior art depicted in FIG. 1.

In another embodiment, not depicted, the afterburner involves annular afterburning formed, for example, using coaxial flame holder rings, and the means of supporting the downstream end of the wall are formed by small bridges fixed to the trailing edges of one of the flame holder rings. These small bridges may be of the same type as the small bridges 152 fixed to the downstream end of the wall 112.

The invention claimed is:

1. An afterburner for a bypass turbojet engine, comprising:
a dividing wall which separates a main air stream from bypass air, the wall including an upstream cylindrical portion and a downstream conical portion, the downstream conical portion being flared outward in a downstream direction;
an attachment unit which attaches the upstream cylindrical portion to an external casing; and
flame holder arms which extend radially with respect to a longitudinal axis of the afterburner, the flame holder arms pass through orifices or notches provided on the downstream conical portion,
wherein each flame holder arm includes
 a flange which extends inside the downstream conical portion so as to present a surface for supporting an edge of a corresponding orifice or notch in the downstream conical portion, and
 a cylindrical rim substantially coaxial with the arm which is provided on the flange and extends radially outward in the orifice or the notch in the downstream conical portion and along the edge of the orifice or of the notch, and
wherein small bridges attached to a downstream end of the downstream conical portion abut against a cylindrical sleeve which provides thermal protection to an afterburner jetpipe.

2. The afterburner as claimed in claim 1, wherein the cylindrical rim provided on the flange is tall enough to prevent hot gases from the main air stream from entering means of ventilation of the flame holder arm.

3. The afterburner as claimed in claim 1, wherein the cylindrical rim extends along the upstream edge of the flange and along at least part of the downstream edge of the flange.

4. The afterburner as claimed in claim 1, wherein the flange is formed as a single piece with the flame holder arm or is attached to the flame holder arm.

5. The afterburner as claimed in claim 1, wherein the cylindrical rim is attached to lateral lugs which fix the flame holder arm to the casing.

6. The afterburner as claimed in claim 1, wherein the part of the arm that extends radially inside the flange has an aerodynamic profile to guarantee that the gas flow around the arm is clean and stable.

7. A bypass turbojet engine which comprises an afterburner as claimed in claim 1.

8. A flame holder arm in combination with the afterburner as claimed in claim 1, comprising, at one end, fixing lugs and which comprises, at the base of these lugs, a substantially radial external flange formed with a cylindrical rim attached to the fixing lugs.

9. The flame holder arm as claimed in claim 8, wherein the flange is formed as one piece with the arm or is attached thereto.

10. The afterburner as claimed in claim 1, wherein a housing which attaches a burner ring to the flame holder arm is provided on the flame holder arm radially inward of the flange.

11. The afterburner as claimed in claim 1, wherein a gap is provided between the bridges and the downstream end of the downstream conical portion and ends of the bridges are attached to the downstream end of the downstream conical portion.

12. The afterburner as claimed in claim 11, wherein the ends of the bridges are attached to the downstream end of the downstream conical portion by welding or brazing.

* * * * *

UNITED STATES PATENT AND TRADEMARK OFFICE
CERTIFICATE OF CORRECTION

| | | |
|---|---|---|
| PATENT NO. | : 7,908,868 B2 | Page 1 of 1 |
| APPLICATION NO. | : 11/693339 | |
| DATED | : March 22, 2011 | |
| INVENTOR(S) | : Jacques Marcel Arthur Bunel et al. | |

It is certified that error appears in the above-identified patent and that said Letters Patent is hereby corrected as shown below:

Column 5, line 51, after "Ω" insert --or--.

Signed and Sealed this
Fifth Day of July, 2011

David J. Kappos
*Director of the United States Patent and Trademark Office*